(12) United States Patent
Akiyama

(10) Patent No.: US 8,143,838 B2
(45) Date of Patent: Mar. 27, 2012

(54) PHASE CURRENT ESTIMATION APPARATUS FOR MOTOR AND MAGNETIC POLE POSITION ESTIMATION APPARATUS FOR MOTOR

(75) Inventor: Masahiko Akiyama, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 12/614,642

(22) Filed: Nov. 9, 2009

(65) Prior Publication Data

US 2010/0117586 A1 May 13, 2010

(30) Foreign Application Priority Data

Nov. 13, 2008 (JP) ................................. 2008-291090

(51) Int. Cl.
*H02P 23/00* (2006.01)
(52) U.S. Cl. .... 318/807; 318/503; 318/801; 318/400.09
(58) Field of Classification Search .................. 318/801, 318/809, 503, 400.09, 400.02, 400.11, 400.36, 318/599, 722, 717, 721
See application file for complete search history.

(56) References Cited

U.S. PATENT DOCUMENTS

2011/0080131 A1* 4/2011 Shimada et al. .............. 318/503

FOREIGN PATENT DOCUMENTS

JP 2005-012934 1/2005

* cited by examiner

*Primary Examiner* — Karen Masih
(74) *Attorney, Agent, or Firm* — Rankin, Hill & Clark LLP

(57) ABSTRACT

A phase current estimation apparatus for a motor capable of suitably improving estimation accuracy of phase currents is provided. The phase current estimation apparatus 10 of the motor includes a control unit 24 that decomposes a command voltage vector Vdq into two vector components V'dq in the case where a magnitude of the command voltage vector Vdq is less than a predetermined lower limit voltage Vlow, so that the command voltage vector Vdq is allowed to have the magnitude equal to or more than the predetermined lower limit voltage Vlow for every two adjacent periods in units of a period of a carrier signal and to have the phase outside a predetermined phase range including phases of reference voltage vectors. Accordingly, the control unit 24 can quantitatively analyze harmonic components, which are generated by decomposing the command voltage vector Vdq into the two vector components V'dq, by using mathematical equations.

3 Claims, 12 Drawing Sheets

PHASE CURRENT ESTIMATION APPARATUS FOR MOTOR AND MAGNETIC POLE POSITION ESTIMATION APPARATUS FOR MOTOR

BACKGROUND OF THE INVENTION

1. Field of the Invention

The present invention relates to a phase current estimation apparatus for a motor and a magnetic pole position estimation apparatus for a motor.

The priority is claimed on Japanese Patent Application No. 2008-291090, filed Nov. 13, 2008, the content of which are incorporated herein by reference.

2. Description of the Related Art

In the related art, for example, there is disclosed an inverter apparatus that outputs two first and second reference voltage vector components, of which phases are different by 60 degrees and from which a command voltage vector can be generated, in a first time interval of one PWM period (one period of a carrier wave) and outputs two third and fourth reference voltage vector components, of which phases are different by 180 degrees with respect to the first and second reference voltage vector components in a second time interval of one PWM period consecutively following the first time interval so as to secure a desired length of a pulse width in the case where a degree of modulation is small or in the case where a phase of an output voltage vector is approximate to a phase of a single reference voltage vector (refer to, for example, Japanese Unexamined Patent Application Publication No. 2005-12934).

However, in the inverter apparatus in the related art, there are problems in that only two-phase modulation is an effective modulation scheme, in that it is difficult to cope with the change in the modulation scheme, and in that it is not possible to improve the general versatility. In addition, since only one phase current can be detected in the one PWM period, a plurality of the PWM periods are needed in order to estimate three phase currents. Therefore, there is a problem in that the estimation cannot be promptly performed. In addition, since harmonic components (that is, the differences between the vectors obtained by the decomposition and the command voltage vector) corresponding to one PWM, which are generated by decomposing the command voltage vector into two vectors in the PWM periods of two first and second time intervals for securing a desired length of a pulse width are not quantitatively analyzed by using mathematical equations, there is a problem in that it is not possible to improve the estimation accuracy of the phase currents by controlling the harmonic components.

The present invention is contrived by taking into consideration the above problems, and an object of the present invention is to provide a phase current estimation apparatus for a motor capable of suitably improving estimation accuracy of a phase current and a magnetic pole position estimation apparatus for a motor capable of suitably improving the estimation accuracy of a magnetic pole position.

SUMMARY OF THE INVENTION

In order to solve the above-described problems and achieve the object, the present invention employs the following.

(1) A first aspect of the present invention is a phase current estimation apparatus for a motor including: an inverter that sequentially commutes electrical conductions of a three-phase AC motor according to a pulse width modulated signal; a pulse width modulated signal generation unit that generates the pulse width modulated signal according to a carrier wave signal; a DC side current sensor that detects a DC side current of the inverter; a phase current estimation unit that estimates a phase current based on the DC side current detected by the DC side current sensor; a determination unit that determines whether or not a magnitude of a command voltage vector of the motor is less than a predetermined lower limit voltage; a vector decomposition unit that decomposes the command voltage vector into two vector components which have the same magnitudes as the predetermined lower limit voltage for every two adjacent periods in units of a period of a carrier wave and the same predetermined phase value at phase-angle-leading-side and phase-angle-lagging-side from the command voltage vector, in the case where the magnitude of the command voltage vector is less than the predetermined lower limit voltage as a determination result of the determination unit; a phase determination unit that determines whether or not a phase of each of the vector components has a value within a predetermined phase range including a phase of a reference voltage vector; and a vector component changing unit that changes the phase and the magnitude of the vector component so that the phase of the vector component is allowed to have a value outside the predetermined phase range and so that a product of a cosine value of a phase difference with respect to the command voltage vector of the vector component and the magnitude of the vector component is allowed to be the same as the magnitude of the command voltage vector, in the case where the phase of the vector component has a value within the predetermined phase range as a determination result of the phase determination unit.

According to the phase current estimation apparatus for the motor of the first aspect of the present invention, the command voltage vector is decomposed into the two vector components, which have the same magnitude as the predetermined lower limit voltage for every two adjacent periods in units of the period of the carrier wave and the same predetermined phase difference at the phase-angle-leading-side and phase-angle-lagging-side from the command voltage vector.

Therefore, for example, even in the case where a desired length of the pulse width (that is, the pulse width in the pulse width modulation) for suitably detecting the DC side current of the inverter is difficult to secure by allowing the magnitude of the command voltage vector to be less than the predetermined lower limit voltage, two phase currents in the time interval of one period of the carrier wave can be suitably acquired by the DC side current sensor detecting the DC side current of the inverter.

In addition, the state where the magnitude of the command voltage vector is less than the predetermined lower limit voltage appears in, for example, a case where a rotation speed of the motor is small, a case where a load torque of the motor is small, or a case where a DC voltage applied to the inverter is large (that is, a case where a modulation rate of the inverter is less than a predetermined value).

Here, the phases of the vector components that are obtained by decomposing the command voltage vector have a value outside the predetermined phase range, and the product of the cosine values of the phases of the vector components and the magnitudes of the vector components are allowed to be the same as the magnitude of the command voltage vector, by changing the phases and magnitudes of the two vector components.

Therefore, even in the case where a desired length of the pulse width for suitably detecting the DC side current of the inverter is difficult to secure by allowing the phase of the one of the two vector components that are obtained by decomposing the command voltage vector to have a value within the predetermined phase range including the phases of the reference voltage vectors, two phase currents in a time interval of one period of the carrier wave can be suitably acquired by the DC side current sensor detecting the DC side current of the inverter by changing the phases and magnitudes of the two vector components.

Therefore, the phase currents can be suitably acquired by the DC side current sensor irrespective of the change in the modulation scheme, that is, two-phase modulation or three-phase modulation, or the change in the frequency of the carrier wave.

(2) A second aspect of the present invention is the phase current estimation apparatus for a motor described in (1) further including a harmonic component calculation unit that calculates a harmonic component corresponding to the vector component.

According to the phase current estimation apparatus for the motor of the second aspect of the present invention, the harmonic components corresponding to the vector components that are obtained by decomposing the command voltage vector can be easily quantitatively analyzed by using mathematical equations. In addition, since the two harmonic components corresponding to the two vector components have the same magnitude and different signs, the sum of the two harmonic components is zero, so that the harmonic components that are generated by decomposing the command voltage vector can be easily controlled.

(3) A third aspect of the present invention is a magnetic pole position estimation apparatus including: the phase current estimation apparatus for a motor according to the second aspect of the present invention and an estimation unit that estimates a magnetic pole position of the motor based on a change in an inductance when the harmonic component is applied to the motor.

According to the magnetic pole position estimation apparatus for the motor of the third aspect of the present invention, since the harmonic components that are generated by decomposing the command voltage vector can be easily controlled, the estimation of the magnetic pole position as well the estimation of the phase currents can be performed based on the change in the inductance.

DETAILED DESCRIPTION OF THE INVENTION

Hereinafter, a phase current estimation apparatus for a motor and a magnetic pole position estimation apparatus for a motor according to embodiments of the present invention will be described with reference to the accompanying drawings.

In the embodiment, the phase current estimation apparatus 10 for a motor (hereinafter, simply referred to as a phase current estimation apparatus 10) estimates phase currents that electrically conduct, for example, a three-phase brushless DC motor 11 (hereinafter, simply referred to as a motor 11). The motor 11 includes a rotator (not shown) having a permanent magnet using a field and a stator (not shown) generating a rotating magnetic field for rotating the rotator.

Figure 1:
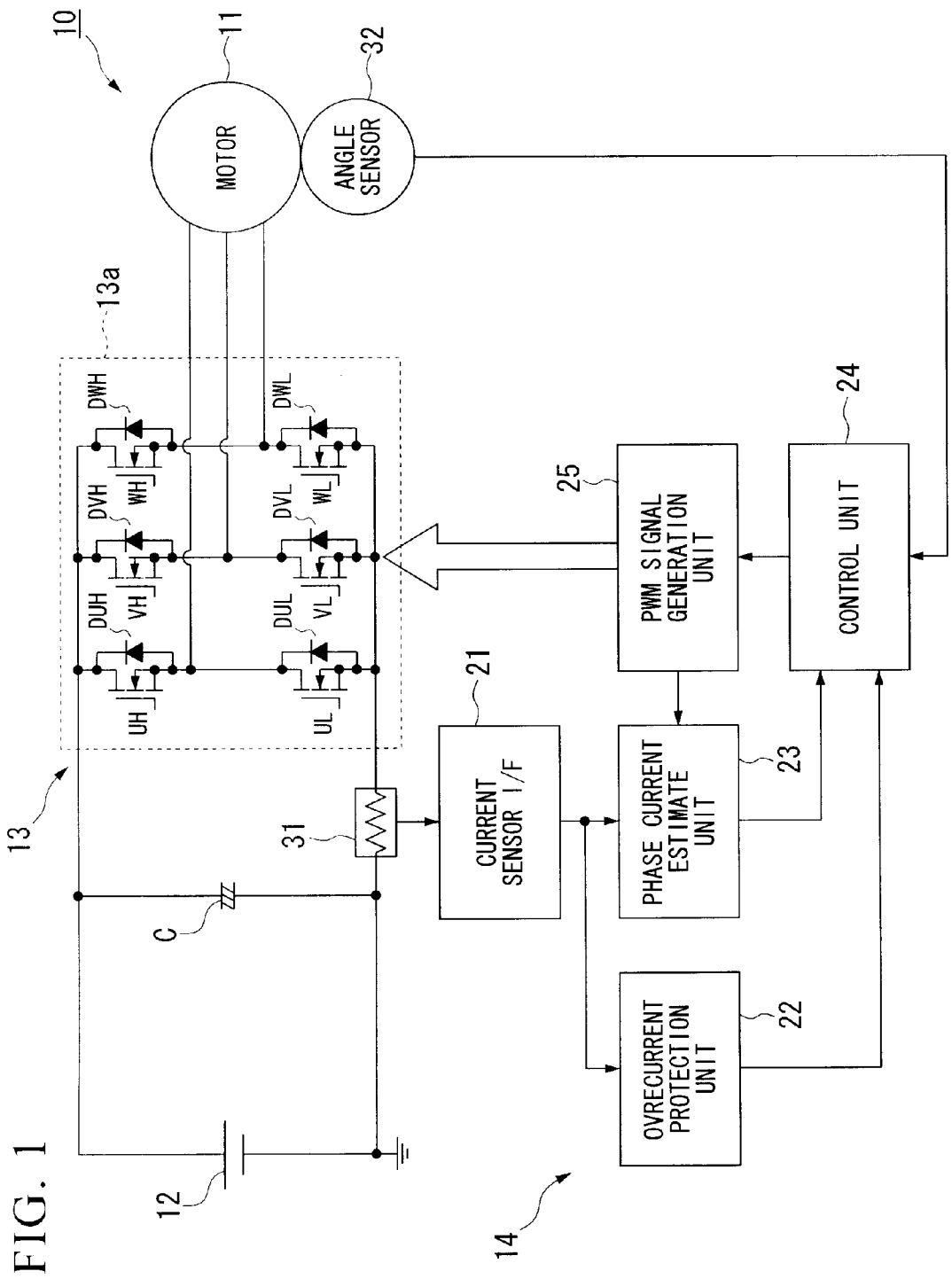
FIG. 1 is a view showing a configuration of a phase current estimation apparatus for a motor according to an embodiment of the present invention.
Figure 2A:
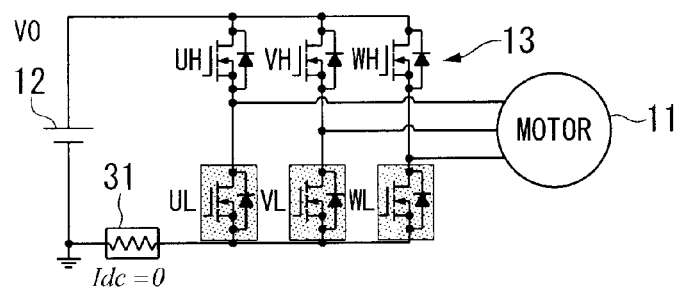
FIGS. 2A to 2H are views showing switching states S1 to S8 of an inverter shown in FIG. 1.
Figure 2B:
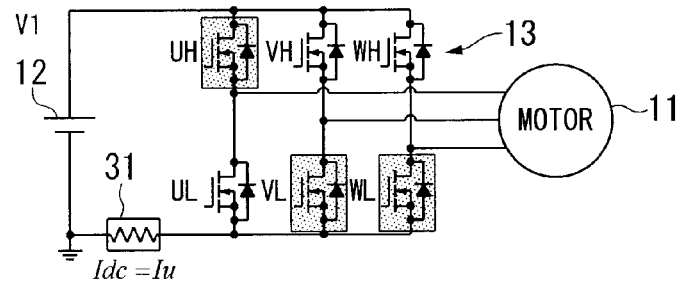
Figure 2C:
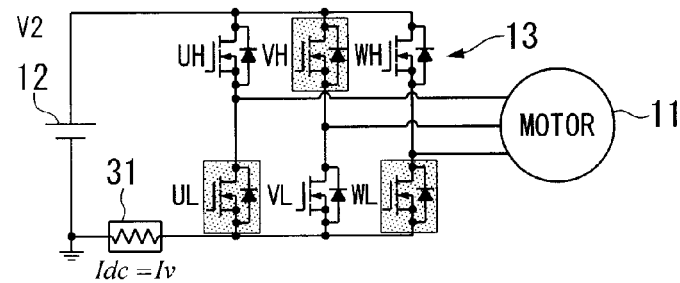
Figure 2D:
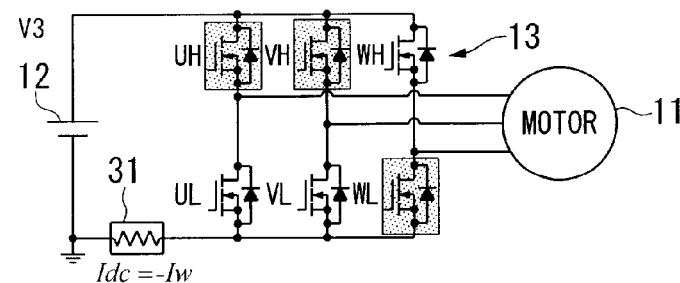
Figure 2E:
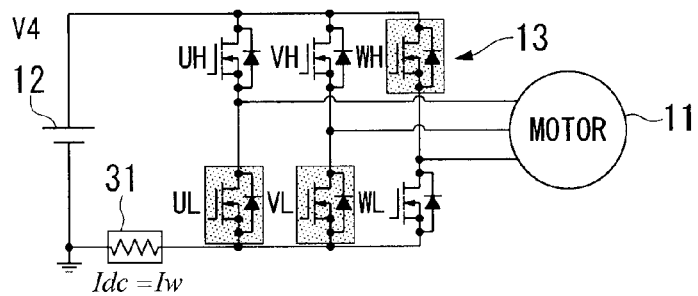
Figure 2F:
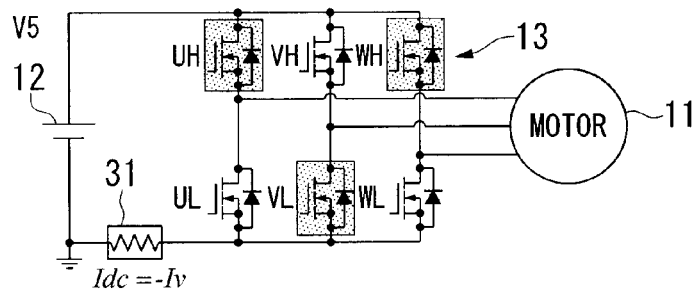
Figure 2G:
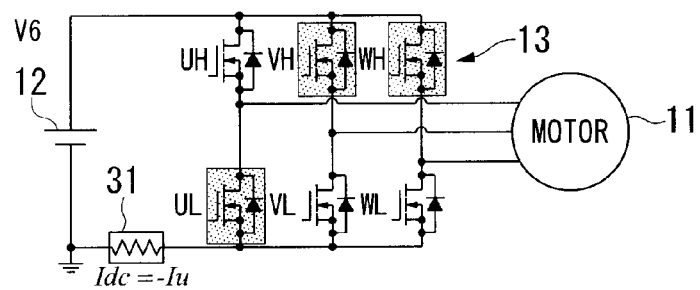
Figure 2H:
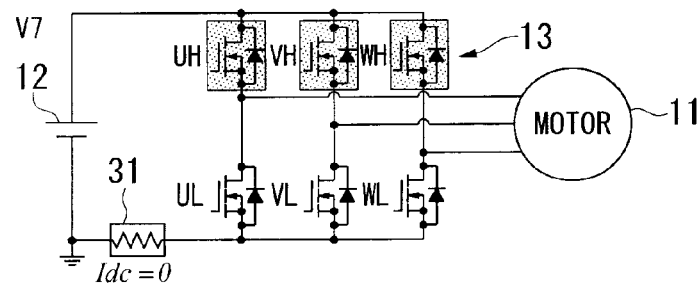

As shown in FIG. 1, the phase current estimation apparatus 10 includes, for example, an inverter 13 having a battery 12 as a DC power supply and a motor control unit 14.

The three-phase (for example, 3 phases of U-phase, V-phase, and W-phase) AC motor 11 is driven by the inverter 13 in response to a control command output from the motor control unit 14.

The inverter 13 includes a bridge circuit 13$a$, in which a bridge connection is constructed by using a plurality of switching devices (for example, MOSFETs: Metal Oxide Semi-conductor Field Effect Transistors), and a smoothing capacitor C. The bridge circuit 13$a$ is driven by a pulse width modulated (PWM) signal.

In the bridge circuit 13$a$, for example, high-side and low-side U-phase transistors UH and UL, high-side and low-side V-phase transistors VH and VL, and high-side and low-side W-phase transistors WH and WL, which constitute a pair for each phase, are bridge-connected. In addition, drains of the transistors UH, VH, and WH are connected to a positive electrode terminal of the battery 12 to constitute a high side arm, and sources of the transistors UL, VL, and WL are connected to a grounded negative electrode terminal of the battery 12 to constitute a low side arm. In addition, for each phase, the sources of the transistors UH, VH, and WH of the high side arm are connected to the drains of transistors UL, VL, and WL of the low side arm, and diodes DUH, DUL, DVH, DVL, DWH, and DWL are connected between the drains and sources of the transistors UH, UL, VII, VL, WH, and WL in the forward direction from the sources to the drains.

In the inverter 13, for example, at the time of driving the motor 11, based on a gate signal (that is, a PWM signal) that is a switching command that is output from the motor control unit 14 to be input to the gates of the transistors UH, VH, WH, UL, VL, and WL, On (conduction)/Off (disconnection) states of the transistors that constitute a pair for each phase are switched, so that a DC power supplied from the battery 12 is converted to a three-phase AC power. In addition, electrical conductions of three-phase stator coils are sequentially commutated, so that an U phase current Iu, a V phase current Iv, and a W phase current Iw are allowed to flow through the stator coils corresponding to the phases.

The motor control unit 14 performs current feedback control (vector control) on a dq coordinate plane that constitutes a rotational perpendicular coordinate system. The motor control unit 14 calculates a target d-axis current Idc and a target q-axis current Iq. Next, the motor control unit 14 calculates phase voltage commands Vu, Vv, and Vw based on the target d-axis current Idc and the target q-axis current Iqc. The motor control unit 14 outputs the PWM signal that is the gate signal to the inverter 13 according to the phase voltage commands Vu, Vv, and Vw and controls phase currents Iu, Iv, and Iw, which are actually to be supplied from the inverter 13 to the motor 11 so that deviations between the d-axis current Ids and the q-axis current Iqs, which are obtained through transformation on the dq coordinate plane, and the target d-axis current Idc and the target q-axis current Iqc are zero.

The motor control unit 14 includes, for example, a current sensor I/F (interface) 21, an overcurrent protection unit 22, a phase current estimation unit 23, a control unit 24, and a PWM signal generation unit 25 (pulse width modulated signal generation unit).

The current sensor I/F (interface) 21 is connected to a DC side current sensor 31, which is disposed between the bridge circuit 13a of the inverter 13 and the negative electrode terminal of the battery 12 so as to detect a DC side current Idc of the bridge circuit 13a of the inverter 13. The current sensor I/F 21 outputs a detection signal, which is output from the DC side current sensor 31, to the overcurrent protection unit 22 and the phase current estimation unit 23.

Alternatively, the DC side current sensor 31 may be disposed between the bridge circuit 13a of the inverter 13 and the positive electrode terminal of the battery 12.

The overcurrent protection unit 22 performs a predetermined overcurrent protection operation according to the DC side current Idc detected by the DC side current sensor 31.

The phase current estimation unit 23 estimates the phase currents Iu, Iv, and Iw, which are actually to be supplied from the inverter 13 to the motor 11, based on the DC side current Idc detected by the DC side current sensor 31 at the detection timing according to the gate signal (that is, PWM signal) output from the PWM signal generation unit 25. In addition, details of the operation of the phase current estimation unit 23 will be described later.

The control unit 24 performs a current feedback control (vector control) on the phase currents Iu, Iv, and Iw output from the phase current estimation unit 23 according to the rotation angle of the motor 11 output from the angle sensor 32 so that the deviations between the d-axis current Ids and the q-axis current Iqs, which are obtained through transformation on the dq coordinate plane, and the target d-axis current Idc and the target q-axis current Iqc are zero. In addition, the control unit 24 outputs the phase voltage commands Vu, Vv, and Vw.

In addition, the angle sensor 32 may be omitted, and instead of the angle sensor 32, an estimation apparatus estimating the magnetic pole position of the rotator of the motor 11 may be included.

In addition, as described later, if a phase of a command voltage vector Vdq has a value within a predetermined phase range including the phases of reference (basic) voltage vectors V1 to V6 so that voltage differences between the phase voltage commands Vu, Vv, and Vw are less than a predetermined value, the phase currents Iu, Iv, and Iw at a desired accuracy by a DC side current sensor 31 may be difficult to estimate. In this case, the control unit 24 decomposes the command voltage vector Vdq into vector components for every two adjacent periods in units of the period of the carrier signal.

In order to allow a sine wave current to flow in three-phase stator coils, the PWM signal generation unit 25 compares the phase voltage commands Vu, Vv, and Vw with the carrier signal having a triangular waveform or the like to generate the gate signal (that is, PWM signal) that drives the transistors UH, VH, WH, UL, VL, and WL of the inverter 13 to be in the On/Off state. Next, in the inverter 13, the On (conduction)/Off (disconnection) states of the transistors, which constitute a pair for each of the three phases, are switched, so that the DC power supplied from the battery 12 is converted to a three-phase AC power. Therefore, electrical conductions of the stator coils of the three-phase motor 11 are sequentially commuted, so that the U phase current Iu, the V phase current Iv, and the W phase current Iw are allowed to flow through the stator coils.

The gate signal input from the PWM signal generation unit 25 to the inverter 13 is a PWM (pulse width modulated) signal according to a combination of the On/Off states of the transistors UH, UL, VH, VL, WH, and WL, which constitute a pair for each phase, that is, according to eight switching states S1 to S8 (that is, the states of the reference voltage vectors V0 to V7 of which phases are different by 60 degrees), for example, as shown in Table 1 and FIGS. 2A to 2H. In the following table 1, on-state transistors among the high-side and low-side transistors are indicated, and in FIGS. 2A to 2H, the on-state transistors are indicated by shading.

In addition, in the DC side of the bridge circuit 13a of the inverter 13, the phase currents Iu. Iv, and Iw are intermittently generated according to the switching states S1 to S8. The DC side current Idc detected by the DC side current sensor 31 becomes any one of the phase currents Iu, Iv, and Iw, a sign-inverted one of any one of the phase currents Iu, Iv, and Iw, or zero.

TABLE 1

| Voltage Vector | U phase | V phase | W phase | Detected Phase Current (Idc) |
|---|---|---|---|---|
| V0 | Low | Low | Low | 0 |
| V1 | High | Low | Low | Iu |
| V2 | Low | High | Low | Iv |
| V3 | High | High | Low | −Iw |
| V4 | Low | Low | High | Iw |
| V5 | High | Low | High | −Iv |
| V6 | Low | High | High | −Iu |
| V7 | High | High | High | 0 |

The phase current estimation unit 23 acquires two phase currents among the three phase currents from the DC side current Idc detected by the DC side current sensor 31 in a predetermined two-combined states among the aforementioned switching states S2 to S7 (that is, the states of the reference (basic) voltage vectors V1 to V6 of which phases are different by 60 degrees) in a time interval of one period of the carrier signal having, for example, a triangular waveform or the like. The phase current estimation unit 23 calculates the other one-phase current among the three phase currents based on the two phase currents. The phase current estimation unit 23 outputs to the control unit 24 the estimated values of the three phase currents that are obtained through the estimation from the DC side current Idc detected by the DC side current sensor 31.

Figure 3:
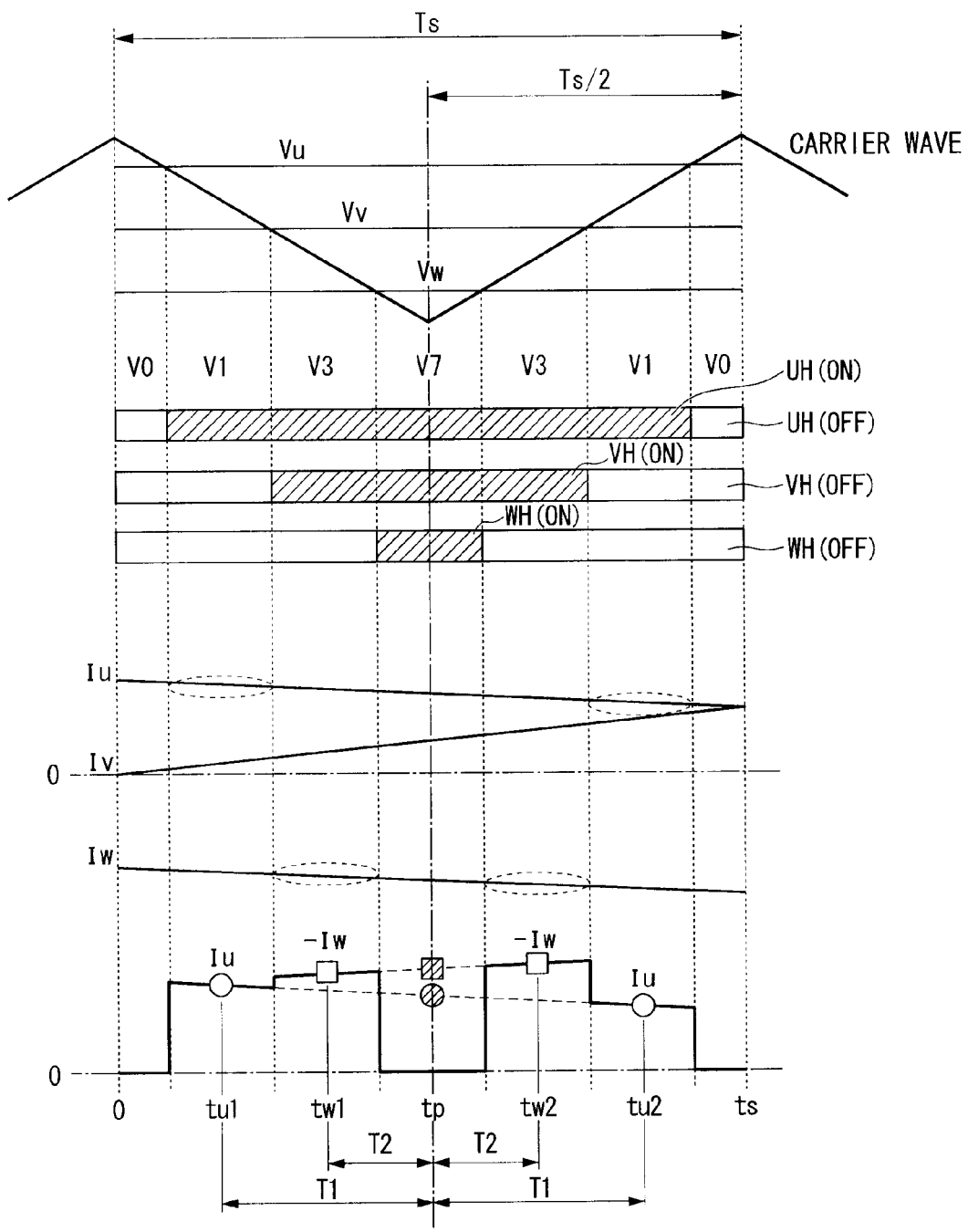
FIG. 3 is a view showing an example of a carrier wave, On/Off patterns of transistors UH, UL, VH, VL, WH, and WL, and detection timings of phase currents according to an embodiment of the present invention.

For example, as shown in FIG. 3, in three-phase modulation using the carrier signal having a triangular waveform, phase current estimation unit 23 can acquire detection values of the two phase currents twice from a voltage pattern, which has a symmetry with respect to a valley peak (carrier peak) of the carrier signal having a triangular waveform in the time interval of one period Ts of the carrier signal.

In other words, the phase current estimation unit 23 acquires the first U phase current Iu1 and the second U phase current Iu2 from the DC side current Idc detected by the DC side current sensor 31 in the states of twice reference voltage vectors V1, which have a symmetry with respect to the carrier peak, at the time points tu1 and tu2 (that is, the time points having the same time interval T1 from the time point tp of the carrier peak of the valley), which have a symmetry with respect to the carrier peak. In addition, the phase current estimation unit 23 acquires the first W phase current Iw1 and the second W phase current Iw2 from the DC side current Idc detected by the DC side current sensor 31 in the states of twice reference voltage vectors V3, which have a symmetry with respect to the carrier peak, at the time points tw1 and tw2 (that is, the time points having the same time interval T2 from the time point tp of the carrier peak of the valley), which have a symmetry with respect to the carrier peak.

Then, the phase current estimation unit 23 calculates an average value for each phase based on the phase currents Iu1 and Iu2 and the phase currents Iw1 and Iw2 and sets the average values to the current values at the time point tp of the carrier peak of the valley.

Next, by using the fact that the total sum of the current values of the phase currents at the same timing is zero, the phase current estimation unit 23 calculates the current value of the other one phase current (for example, the V phase current) from the current values (that is, the current values at the time point tp of the carrier peak of the valley) of the two phase currents (for example, the U phase current and the W phase current).

In addition, although the phase current estimation unit 23 calculates the average values based on the phase currents Iu1 and Iu2 and the phase currents Iw1 and Iw2 and estimates the other one phase current from the two phase currents, the present invention is not limited thereto, but other estimation methods may be used to estimate the phase currents.

Figure 4:
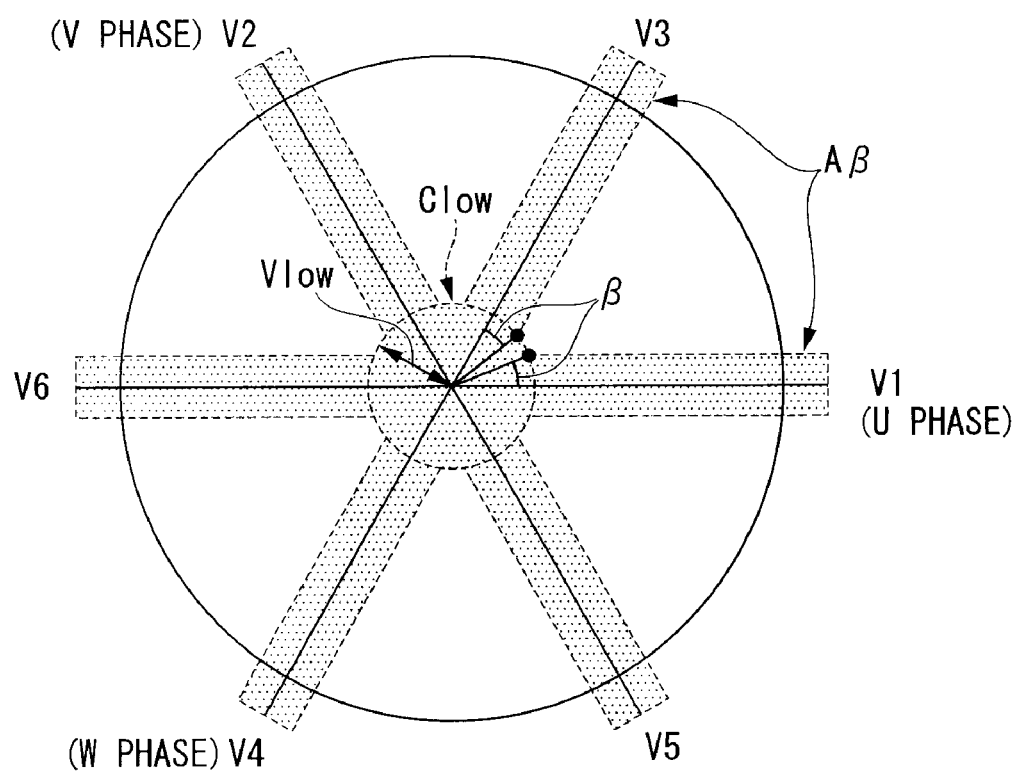
FIG. 4 is a view showing an example of reference voltage vectors V1 to V6 according to an embodiment of the present invention.

The control unit 24 determines whether or not the magnitude of the command voltage vector Vdq is equal to or more than the predetermined lower limit voltage Vlow. As a determination result, in the case where the magnitude of the command voltage vector Vdq is equal to or more than the predetermined lower limit voltage Vlow, the control unit 24 further determines whether or not the phase of the command voltage vector Vdq has a value within the predetermined phase range (for example, as shown in FIG. 4, a range where the voltage vector having the predetermined magnitude has a value within the predetermined phase β at the phase-angle-leading-side or phase-angle-lagging-side from the reference voltage vectors V1 to V6) including the phases of the reference voltage vectors V1 to V6.

As a determination result, in the case where the phase of the command voltage vector Vdq has a value within the predetermined phase range including the phases of the reference voltage vectors V1 to V6, the control unit 24 decomposes the command voltage vector Vdq into the two vector components Vdq1 and Vdq2 having the same predetermined phase difference γ at the phase-angle-leading-side and phase-angle-lagging-side from the command voltage vector Vdq. The control unit 24 outputs to the PWM signal generation unit 25 the phase voltage commands Vu, Vv, and Vw according to the vector components Vdq1 and Vdq2 and calculates the harmonic components corresponding to the vector components Vdq1 and Vdq2 based on the predetermined phase difference γ.

Figure 5:
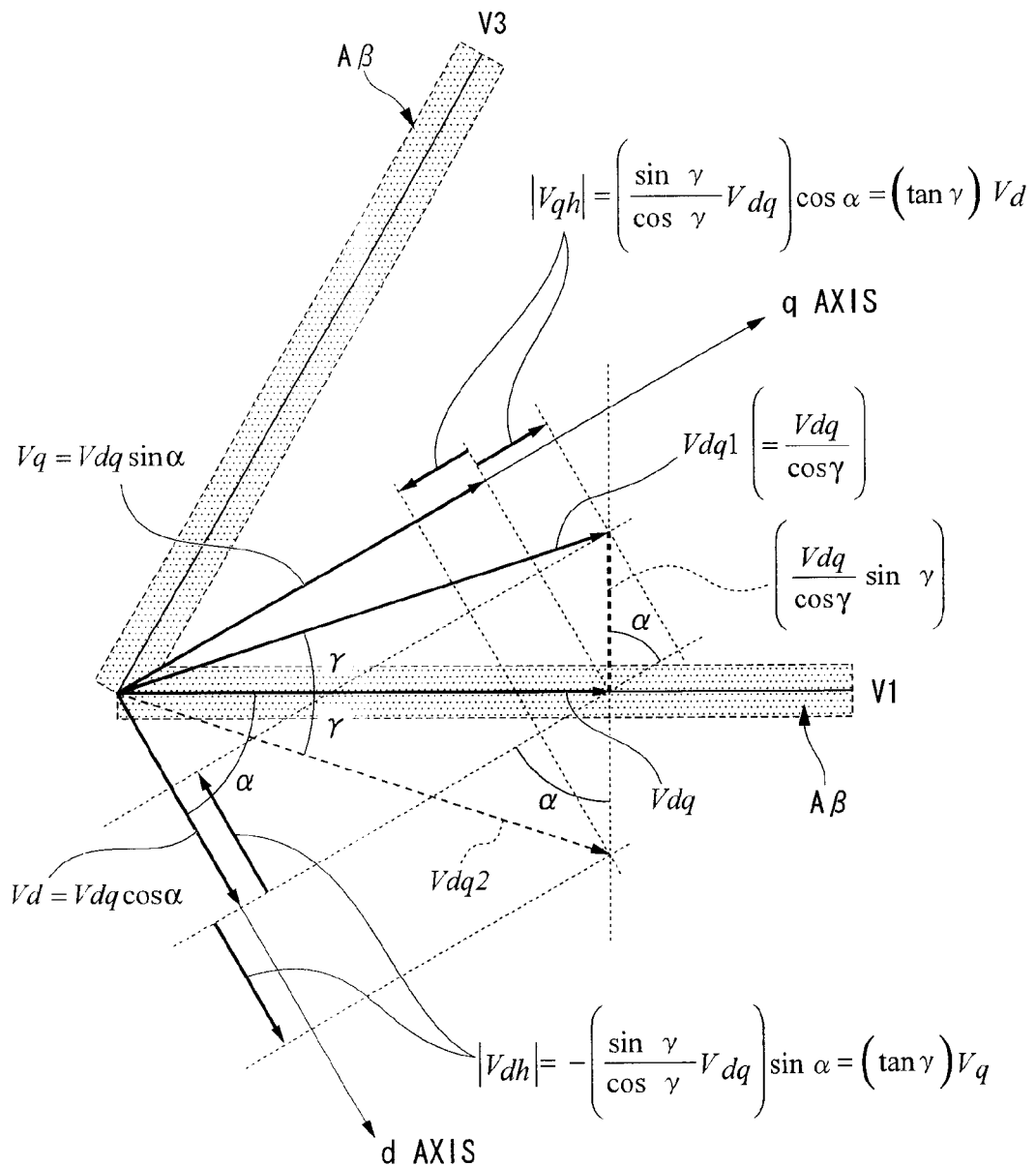
FIG. 5 is a view showing an example of a command voltage vector Vdq, two vector components Vdq1 and Vdq2, a d-axis harmonic component Vdh, and a q-axis harmonic component Vqh according to an embodiment of the present invention.

For example, as shown in FIG. 5, if it is determined that the phase of the command voltage vector Vdq is the same as the phase of the reference voltage vector V1 and the phase of the command voltage vector Vdq has a value within the predetermined phase range Aβ including the phases of the reference voltage vectors V1 to V6, the control unit 24 decomposes the command voltage vector Vdq into two vector components Vdq1 and Vdq2 having a predetermined phase difference γ(>β) larger than at least the predetermined phase β with respect to the command voltage vector Vdq. The two vector components Vdq1 and Vdq2 are vectors for every two adjacent periods in units of the period of the carrier signal. The magnitudes of the two vector components Vdq1 and Vdq2 are expressed by, for example, the following equation (1).

In addition, the predetermined phase range Aβ is, for example, a range where the described-later predetermined lower limit voltage Vlow is within a predetermined phase β at a phase-angle-leading-side or phase-angle-lagging-side from the reference voltage vectors V1 to V6. In addition, the state where the phase of the command voltage vector Vdq has a value within the predetermined phase range Aβ is a state where a desired length of a pulse width (that is, a pulse width in the pulse width modulation) for suitably detecting the DC side current of the inverter 13 by the DC side current sensor 31 is difficult to secure.

$$Vdq1 = Vdq2 = \frac{Vdq}{\cos\gamma} \qquad (1)$$

In addition, the d-axis component Vd and q-axis component Vq of the command voltage vector Vdq on the dq coordinate plane are expressed by, for example, the following equation (2) according to the phase difference α of the command voltage vector Vdq with respect to the d axis on the dq coordinate plane.

$$\left.\begin{array}{l} Vd = Vdq\cdot\cos\alpha \\ Vq = Vdq\cdot\sin\alpha \end{array}\right\} \qquad (2)$$

In addition, the harmonic components Vdqh that are generated by decomposing the command voltage vector Vdq into the two vector components Vdq1 and Vdq2 have the same magnitude and different signs. The d-axis component (d-axis harmonic component Vdh) and q-axis component (q-axis harmonic component Vqh) of the harmonic components Vdqh and the d-axis component Vd and q-axis component Vq of the command voltage vector Vdq on the dq coordinate plane are expressed by, for example, the following equations (3) and (4).

$$\begin{aligned} Vd \pm Vdh &= \frac{1}{\cos\gamma} Vdq\cos(\alpha \pm \gamma) \\ &= \frac{1}{\cos\gamma} Vdq(\cos\alpha\cos\gamma \mp \sin\alpha\sin\gamma) \\ &= Vdq\cos\alpha \mp \left(\frac{\sin\gamma}{\cos\gamma} Vdq\right)\sin\alpha \\ &\quad (=Vd \mp (\tan\gamma)Vq) \end{aligned} \qquad (3)$$

$$\begin{aligned} Vq \pm Vqh &= \frac{1}{\cos\gamma} Vdq\sin(\alpha \pm \gamma) \\ &= \frac{1}{\cos\gamma} Vdq(\sin\alpha\cos\gamma \pm \cos\alpha\sin\gamma) \\ &= Vdq\sin\alpha \pm \left(\frac{\sin\gamma}{\cos\gamma} Vdq\right)\cos\alpha \\ &\quad (=Vq \pm (\tan\gamma)Vd) \end{aligned} \qquad (4)$$

In other words, the d-axis harmonic component Vdh and the q-axis harmonic component Vqh are expressed by, for example, the following equations (5) and (6).

$$Vdh = -\left(\frac{\sin\gamma}{\cos\gamma}Vdq\right)\sin\alpha \quad (5)$$
$$(=(\tan\gamma)Vq)$$

$$Vqh = \left(\frac{\sin\gamma}{\cos\gamma}Vdq\right)\cos\alpha \quad (6)$$
$$(=(\tan\gamma)Vd)$$

In addition, in the case where a magnitude of the command voltage vector Vdq is less than a predetermined lower limit voltage Vlow, the control unit 24 decomposes the command voltage vector Vdq into two vector components V'dq, which have the same magnitude as the predetermined lower limit voltage Vlow for every two adjacent periods in units of the period of the carrier signal and the same predetermined phase difference γ at the phase-angle-leading-side and the phase-angle-lagging-side from the command voltage vector Vdq.

In addition, the state where the magnitude of the command voltage vector Vdq is less than a predetermined lower limit voltage Vlow is, for example, a case where the rotation speed of the motor 11 is small, a case where the load torque of the motor 11 is small, or a case where a DC voltage applied to the inverter 13 is large (that is, a case where a modulation rate of the inverter 13 is smaller than a predetermined value), in which a desired length of the pulse width (that is, the pulse width in the pulse width modulation) for suitably detecting the DC side current of the inverter 13 by the DC side current sensor 31 is difficult to secure.

In addition, the control unit 24 determines whether or not a phase of any one of two vector components V'dq has a value within a predetermined phase range Aβ (for example, a range where the predetermined lower limit voltage Vlow is within a predetermined phase β at the phase-angle-leading-side or phase-angle-lagging-side from the reference voltage vectors V1 to V6) including the phases of the reference voltage vectors V1 to V6.

Figure 6:
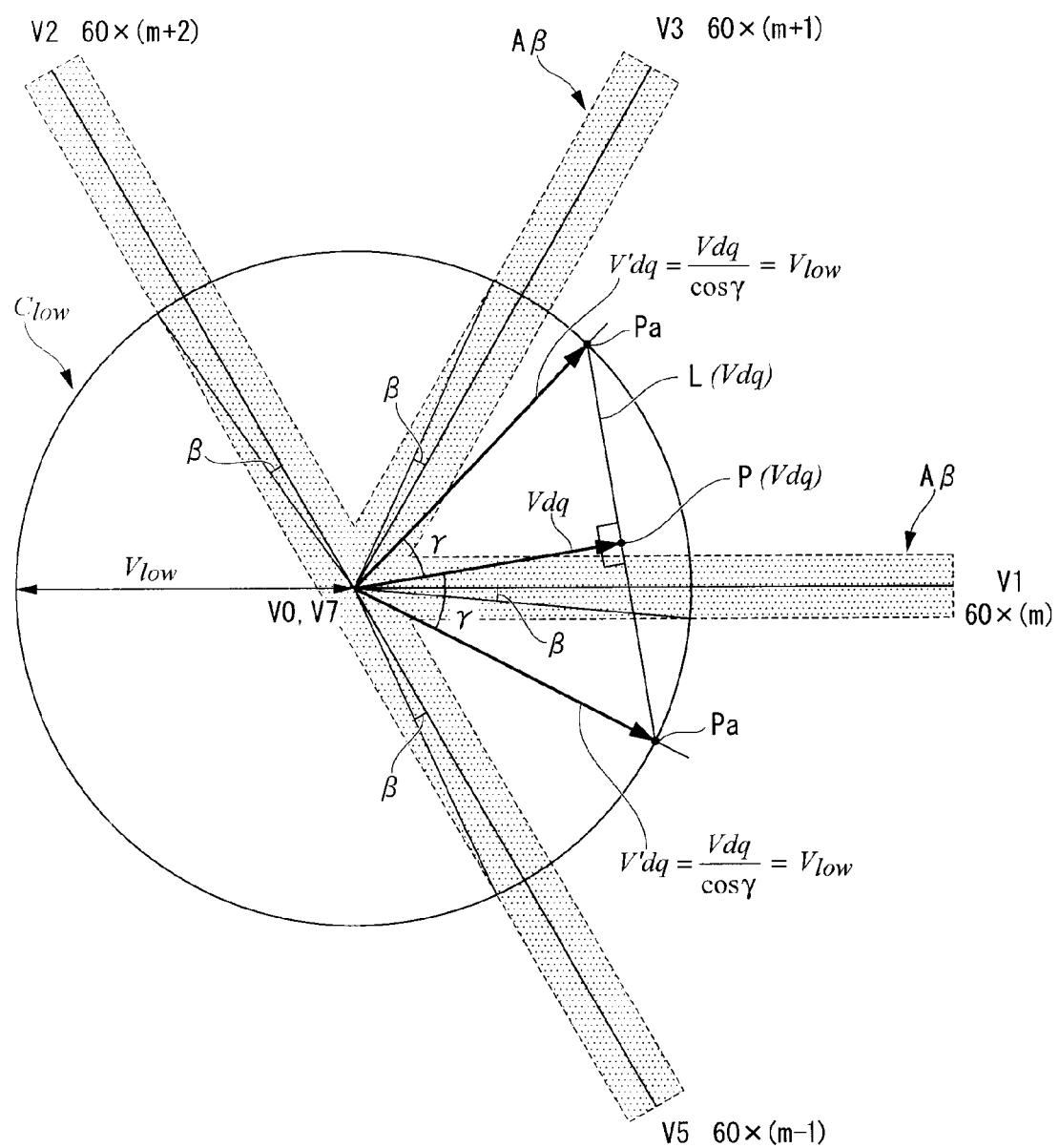
FIG. 6 is a view showing an example of a command voltage vector Vdq and two vector components V'dq according to an embodiment of the present invention.

As a determination result, for example, as shown in FIG. 6, in the case where each phase of the two vector components V'dq has a value outside the predetermined phase range Aβ including the phases of the reference voltage vectors V1 to V6, the control unit 24 outputs to the PWM signal generation unit 25 the phase voltage commands Vu, Vv, and Vw according to the two vector components V'dq and calculates harmonic components corresponding to the vector components V'dq based on the predetermined phase difference γ.

Figure 7:
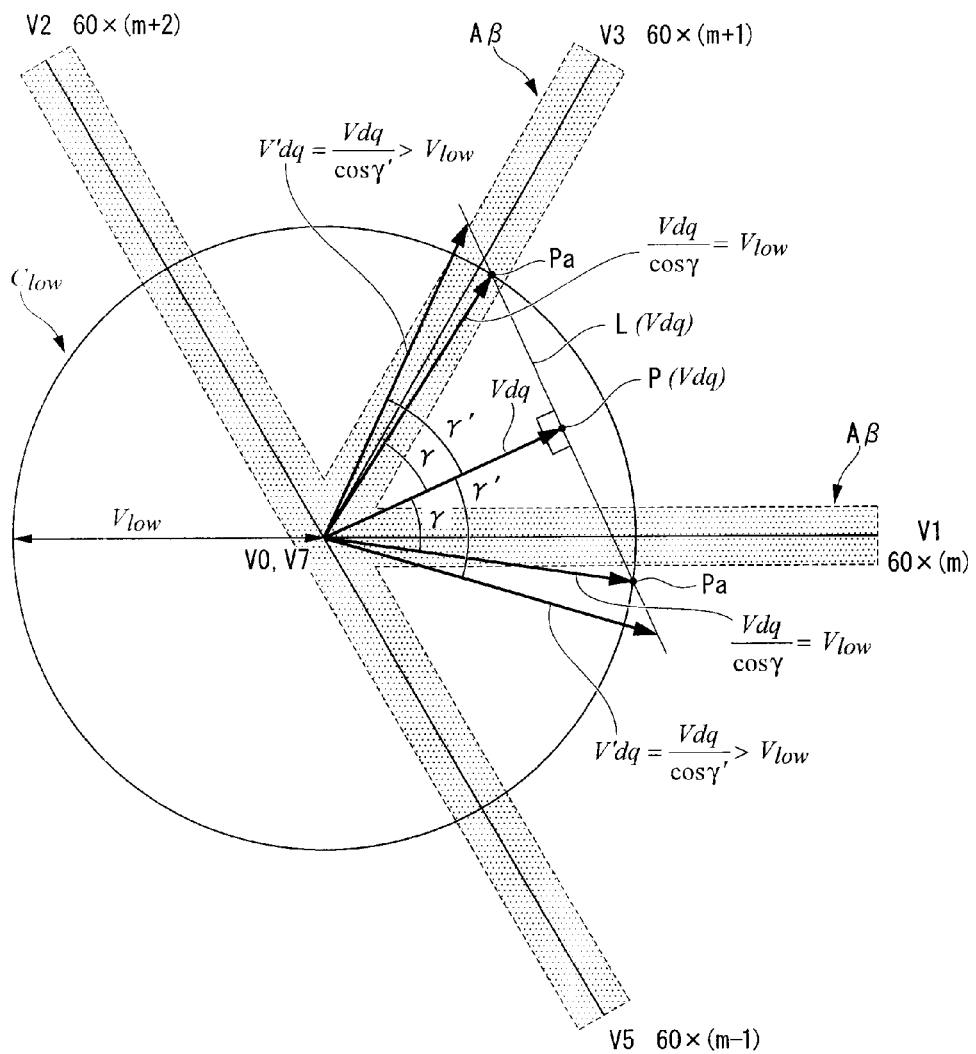
FIG. 7 is a view showing an example of a command voltage vector Vdq and two vector components V'dq according to an embodiment of the present invention.

On the other hand, as a determination result, for example, as shown in FIG. 7, in the case where each phase of the two vector components V'dq has a value within the predetermined phase range Aβ including the phases of the reference voltage vectors V1 to V6, the control unit 24 changes the phases and magnitudes of the vector components V'dq so that the phases of the vector components V'dq are caused to be outside the predetermined phase range Aβ and so that a product of a cosine value of the phase difference with respect to the command voltage vectors Vdq of the vector components V'dq and the magnitudes of the vector components V'dq is caused to be the same as the magnitude of the command voltage vector Vdq. Next, the control unit 24 outputs to the PWM signal generation unit 25 the phase voltage commands Vu, Vv, and Vw according to the two after-changed vector components V'dq and calculates the harmonic components corresponding to the vector components V'dq based on the phases of the after-changed vector components V'dq.

For example, as shown in FIGS. 6 and 7, in the case where the magnitude of the command voltage vector Vdq is less than the predetermined lower limit voltage Vlow, the control unit 24 decomposes the command voltage vector Vdq into the two vector components V'dq, which have the same magnitude as the predetermined lower limit voltage Vlow for every two adjacent periods in units of the period of the carrier signal and the same predetermined phase difference γ at the phase-angle-leading-side and the phase-angle-lagging-side from the command voltage vector Vdq. At this time, as expressed by the following equation (7), the control unit 24 sets the product of the cosine value of the predetermined phase difference γ and the vector components V'dq to be the same as the magnitude of the command voltage vector Vdq.

$$\left.\begin{array}{c} V'dq = \dfrac{Vdq}{\cos\gamma} \\ |V'dq| = |Vlow| \end{array}\right\} \quad (7)$$

In other words, for example, as shown in the voltage vector diagram of FIGS. 6 and 7, the intersections Pa between the straight line L(Vdq) perpendicular to the command voltage vector Vdq including the coordinate position P(Vdq) according to the command voltage vector Vdq and the voltage circle (lower limit voltage circle Clow) having a radius equal to the magnitude of the predetermined lower limit voltage Vlow become the coordinate positions according to the vector components V'dq.

For example, as shown in FIG. 6, in the case where the phases of the two vector components V'dq have a value outside the predetermined phase range Aβ including the phases of the reference voltage vectors V1 to V6, the control unit 24 calculates the harmonic components corresponding to the vector components V'dq based on the predetermined phase difference γ and the aforementioned equations (1) to (6).

Figure 8:
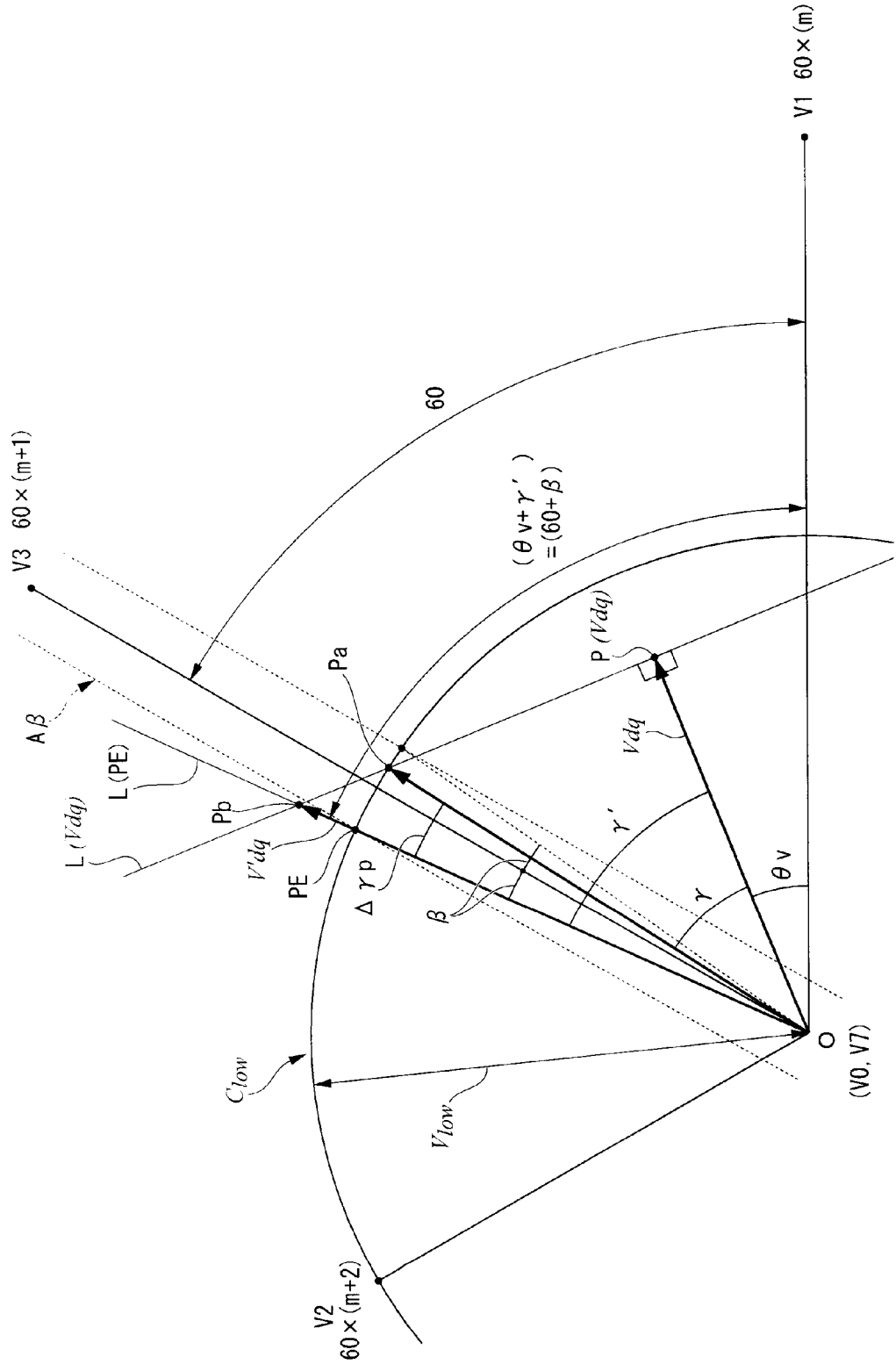
FIG. 8 is a view showing an example of a command voltage vector Vdq and a phase-angle-leading-side vector component V'dq according to an embodiment of the present invention.

On the other hand, for example, as shown in FIG. 7, in the case where the phase of any one of the two vector components V'dq has a value within the predetermined phase range Aβ including the phases of the reference voltage vectors V1 to V6, for example, as shown in FIG. 8, the phase of the boundary point of the predetermined phase range (reference voltage vector region) Aβ of the reference voltage vector, that is, the phase of the position PE of the predetermined phase β at the phase-angle-leading-side or phase-angle-lagging-side from the reference voltage vector is set to a new phase of the vector component V'dq. For example, with respect to the phase-angle-leading-side vector component V'dq of the command voltage vector Vdq, the phase of the phase-angle-leading-side boundary point PE of the reference voltage vector region Aβ including the vector component V'dq is set to a new phase. Similarly, for example, with respect to the phase-angle-lagging-side vector component V'dq of the command voltage vector Vdq, the phase of the phase-angle-lagging-side boundary point of the reference voltage vector region Aβ including the vector component V'dq is set to a new phase. Accordingly, the after-phase-changed vector component V'dq has a new phase difference γ' with respect to the command voltage vector Vdq.

Therefore, in the magnitude of the after-phase-changed vector component V'dq, for example, as expressed by the following equation (8), the product of the cosine value of the phase difference (γ') and the vector component V'dq is set to be the same as the magnitude of the command voltage vector Vdq, so that the magnitude of the vector component V'dq is more than the predetermined lower limit voltage Vlow.

$$V'dq = \frac{Vdq}{\cos\gamma'}$$
$$|V'dq| > |Vlow|$$
(8)

In other words, the coordinate position of the new vector component V'dq, of which phase and magnitude thereof are changed, becomes the intersection Pb between the straight line L(PE) including the origin O and the boundary point PE of the reference voltage vector region Aβ and the straight line L(Vdp) perpendicular to the command voltage vector Vdq including the coordinate position P(Vdq) according to the command voltage vector Vdq.

In addition, the phase of the one vector component V'dq of the two vector components V'dq has a value within the predetermined phase range Aβ, so that the phase and magnitude of the one vector component V'dq are changed. Therefore, the phase and magnitude of the other vector component V'dq are also changed. At this time, in the case where the new phase of the other vector component V'dq has a value within the predetermined phase range Aβ, due to the change in the phase and magnitude of the other vector component V'dq, the phase and magnitude of the one vector component V'dq are further changed.

For example, as shown in the voltage vector diagram of FIG. 8, in the case where a phase-angle-leading-side vector component V'dq, of which phase is leading only by the predetermined phase difference γ from the command voltage vector Vdq having the phase θv, has a value within the predetermined phase range Aβ with respect to the reference voltage vector V3, firstly, the phase (that is, (60x(m+1)+β)) of the boundary point PE of the predetermined phase β at the phase-angle-leading-side from the reference voltage vector V3 is set to a new phase of the phase-angle-leading-side vector component V'dq.

The magnitude of the vector component V'dq is changed by the intersection Pb between the straight line L(PE) including the origin O and the boundary point PE and the straight line L(Vdp) perpendicular to the command voltage vector Vdq including the coordinate position P(Vdq).

In the case where the phases of the two vector components V'dq, of which phases and magnitudes are changed, have a value outside the predetermined phase range Aβ including the phases of the reference voltage vectors V1 to V6, the control unit 24 calculates the harmonic components corresponding to the vector components V'dq based on the phase difference γ' and the aforementioned equations (1) to (6).

The phase current estimation apparatus 10 of the motor according to the embodiment has the aforementioned configuration. Then, the operation of the phase current estimation apparatus 10, particularly, the process of decomposing the command voltage vector Vdq in the case where the magnitude of the command voltage vector Vdq is less than the predetermined lower limit voltage Vlow is described.

Figure 9:
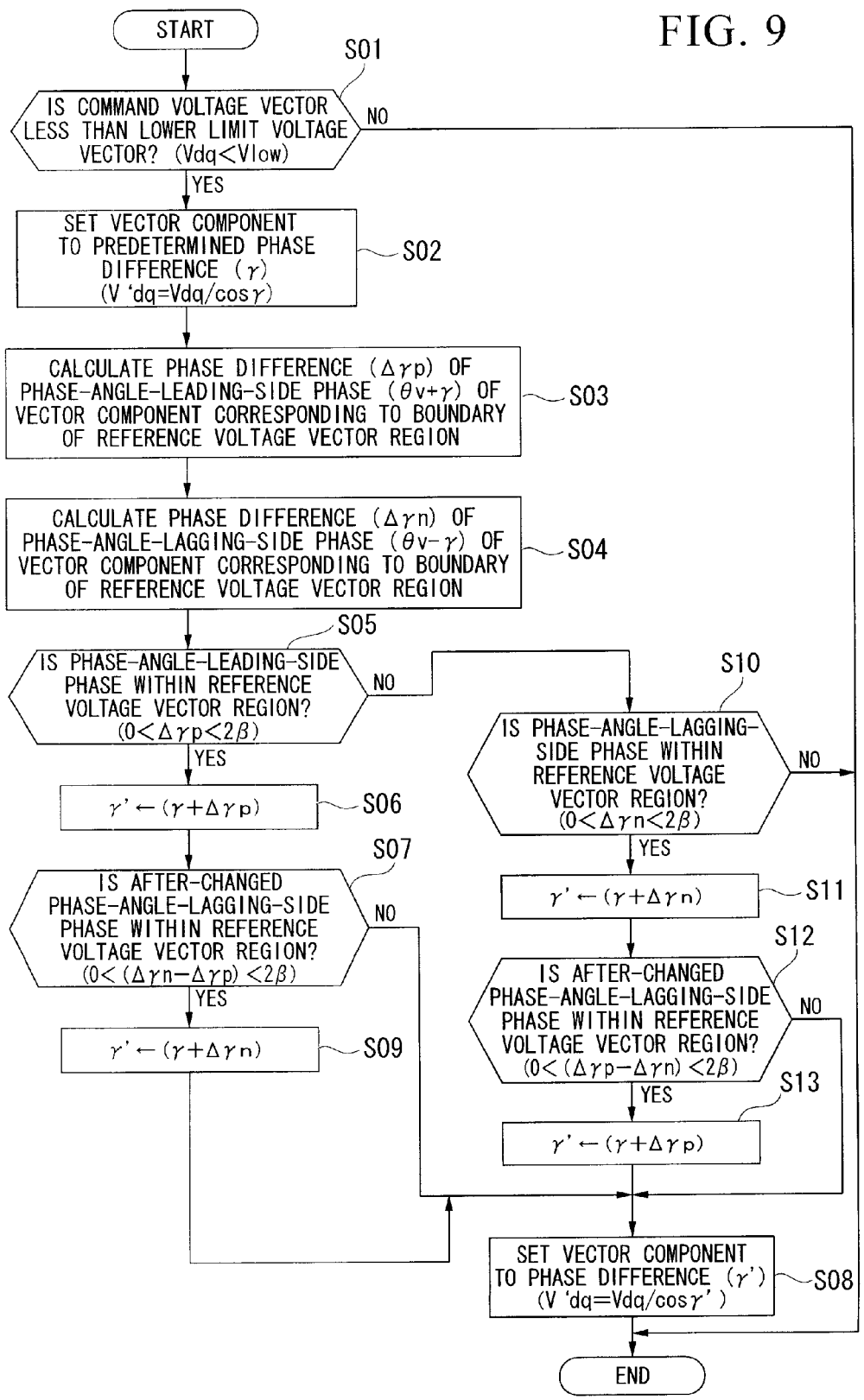
FIG. 9 is a flowchart showing operations of a phase current estimation apparatus for a motor according to an embodiment of the present invention.

Firstly, for example, in Step S01 shown in FIG. 9, it is determined whether or not the magnitude of the command voltage vector Vdq is less than the predetermined lower limit voltage Vlow.

In the case where the determination result is "NO", the process proceeds to END.

On the other hand, in the case where the determination result is "YES", the process proceeds to Step S02.

In Step S02, the command voltage vector Vdq is decomposed into two vector components V'dq, which have the same magnitude as the predetermined lower limit voltage Vlow for every two adjacent periods in units of the period of the carrier signal and the same predetermined phase difference γ at the phase-angle-leading-side and the phase-angle-lagging-side from the command voltage vector Vdq. Therefore, the vector components V'dq are expressed by the aforementioned equation (7).

In Step S03, the phase difference Δγp between the phase-angle-leading-side vector component V'dq of the command voltage vector Vdq and the phase-angle-leading-side boundary point PE of the reference voltage vector region Aβ is calculated.

Figure 10:
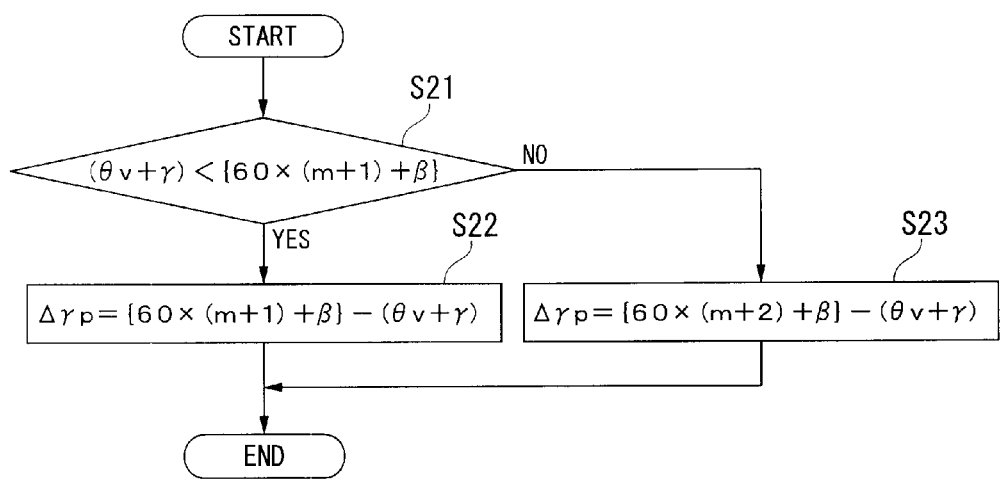
FIG. 10 is a flowchart showing operations of a phase current estimation apparatus for a motor according to an embodiment of the present invention.

At this time, for example, similarly to Steps S21 to S23 shown in FIG. 10, the process switches the calculation of the phase difference Δγp according to whether or not the phase (θv+γ) of the vector component V'dq is less than the phase (60x(m+1)+β) of the boundary point PE with respect to an arbitrary natural number m.

In other words, for example, in Step S21 shown in FIG. 10, it is determined whether or not the phase (θv+γ) of the vector component V'dq is less than the phase (60x(m+1)+β) of the boundary point PE with respect to an arbitrary natural number m.

In the case where the determination result is "YES", the process proceeds to Step S22. In Step S22, the phase difference is calculated by the equation of Δγp={60x(m+1)+β}−(θv+γ).

On the other hand, in the case where the determination result is "NO", the process proceeds to Step S23. In Step S23, the phase difference is calculated by the equation of Δγp={60x(m+2)+β}−(θv+γ).

In Step S04, the phase difference Δγn between the phase-angle-lagging-side vector component V'dq of the command voltage vector Vdq and the phase-angle-lagging-side boundary point PE of the reference voltage vector region Aβ is calculated.

Figure 11:
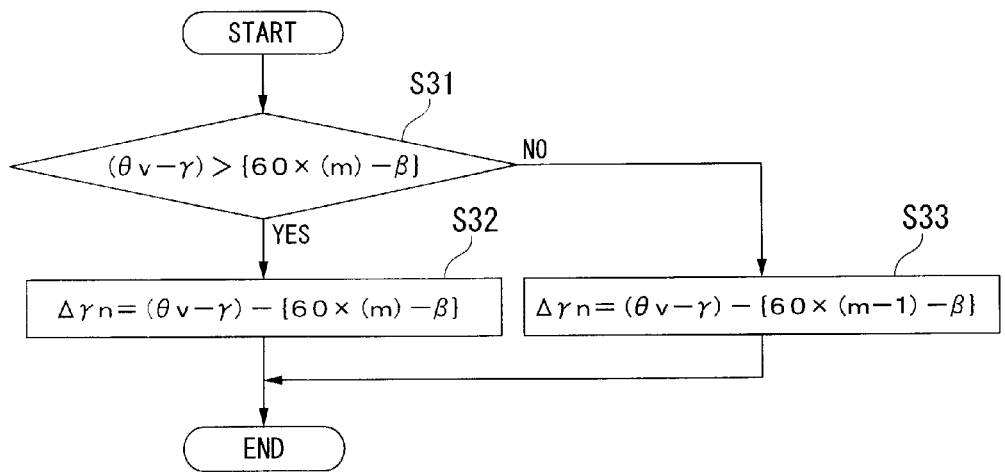
FIG. 11 is a flowchart showing operations of a phase current estimation apparatus for a motor according to an embodiment of the present invention.

At this time, for example, similarly to Steps S31 to S33 shown in FIG. 11, the process switches the calculation of the phase difference Δγn according to whether or not the phase (θv−γ) of the vector component V'dq is more than the phase (60x(m)−β) of the boundary point PE with respect to an arbitrary natural number m.

In other words, for example, in Step S31 shown in FIG. 11, it is determined whether or not the phase (θv−γ) of the vector component V'dq is more than the phase (60x(m)−β) of the boundary point PE with respect to an arbitrary natural number m.

In the case where the determination result is "YES", the process proceeds to Step S32. In Step S32, the phase difference is calculated by the equation of Δγn=(θv−γ)−{60x(m−1)−β}.

On the other hand, in the case where the determination result is "NO", the process proceeds to Step S33. In Step S33, the phase difference is calculated by the equation of Δγn=(θv−γ)−{60x(m−1)−β}. In Step S05, it is determined whether or not the phase of the phase-angle-leading-side vector component V'dq according to the phase difference Δγp has a value within the reference voltage vector region Aβ.

In the case where the determination result is "YES", that is, in the case where the phase difference Δγp is more than 0 and less than twice the predetermined phase β (0<Δγp<2xβ), the process proceeds to Step S06.

On the other hand, in the case where the determination result is "NO", the process proceeds to Step S10 described later.

In Step S06, the value that is obtained by adding the phase difference Δγp to the predetermined phase difference γ is set to a phase difference γ', and the phase-angle-leading-side and phase-angle-lagging-side vector components V'dq are allowed to have the phase difference γ' with respect to the command voltage vector Vdq, so that the phases of the phase-angle-leading-side and phase-angle-lagging-side vector components V'dq are changed.

In Step S07, in the case where, the phase of the phase-angle-lagging-side vector component V'dq is changed by the phase difference Δγp due to the change in the phase of the phase-angle-leading-side vector component V'dq, it is determined whether or not a new phase of the phase-angle-lagging-side vector component V'dq has a value within the reference voltage vector region Aβ.

In the case where the determination result is "YES", that is in the case where the value (Δγn−Δγp) that is obtained by subtracting the phase difference Δγp from the phase difference Δγn is more than 0 and less than twice the predetermined phase β (0<(Δγn−Δγp)<2×β), the process proceeds to Step S08 described later.

On the other hand, in the case where the determination result is "NO", the process proceeds to Step S09.

In Step S09, the value that is obtained by adding the phase difference Δγn to the predetermined phase difference γ is set to the phase difference γ', and the phase-angle-leading-side and phase-angle-lagging-side vector components V'dq are allowed to have the phase difference γ' with respect to the command voltage vector Vdq, so that the phases of the phase-angle-leading-side and phase-angle-lagging-side vector components V'dq are changed.

In Step S08, the vector component V'dq is expressed by the aforementioned equation (8) according to the phase difference γ' that is set at this time, and the process proceeds to END, so that the process is ended.

In addition, in Step S10, it is determined whether or not the phase of the phase-angle-lagging-side vector component V'dq according to the phase difference Δγn has a value within the reference voltage vector region Aβ.

In the case where the determination result is "YES", that is, in the case where the phase difference Δγn is more than 0 and less than twice the predetermined phase β (0<Δγn<2×β), the process proceeds to Step S11.

On the other hand, in the case where the determination result is "NO", the process proceeds to END, so that the process is ended.

In Step S11, the value that is obtained by adding the phase difference Δγn to the predetermined phase difference γ is set to the phase difference γ', and the phase-angle-leading-side and phase-angle-lagging-side vector components V'dq are allowed to have the phase difference γ' with respect to the command voltage vector Vdq, so that the phases of the phase-angle-leading-side and phase-angle-lagging-side vector components V'dq are changed.

In Step S12, in the case where the phase of the phase-angle-leading-side vector component V'dq is changed by the phase difference Δγn due to the change in the phase of the phase-angle-lagging-side vector component V'dq, it is determined whether or not a new phase of the phase-angle-leading-side vector component V'dq has a value within the reference voltage vector region Aβ.

In the case where the determination result is "YES", that is, in the case where the value (Δγp−Δγn) that is obtained by subtracting the phase difference Δγn from the phase difference Δγp is more than 0 and less than twice the predetermined phase β (0<(Δγp−Δγn)<2×β), the process proceeds to Step S13 described later.

On the other hand, in the case where the determination result is "NO", the process proceeds to Step S08.

In Step S13, the value that is obtained by adding the phase difference Δγp to the predetermined phase difference γ is set to the phase difference γ', and the phase-angle-leading-side and phase-angle-lagging-side vector components V'dq are allowed to have the phase difference γ' with respect to the command voltage vector Vdq, so that the phases of the phase-angle-leading-side and phase-angle-lagging-side vector components V'dq are changed.

As described above, according to the phase current estimation apparatus 10 of the motor of the embodiment, in the case where the magnitude of the command voltage vector Vdq is less than the predetermined lower limit voltage Vlow, the command voltage vector Vdq is decomposed into the two vector components V'dq, which have the same magnitude as the predetermined lower limit voltage Vlow for every two adjacent periods in units of the period of the carrier signal and the same predetermined phase difference γ at the phase-angle-leading-side and the phase-angle-lagging-side from the command voltage vector. Therefore, in the DC side current sensor 31 detecting the DC side current of the inverter 13, two phase currents can be suitably acquired in a time interval of one period of the carrier signal. In addition, by using the fact that the total sum of the three phase currents at the same timing is zero, the other phase current can be estimated, so that the three phase currents Iu, Iv, and Iw can be promptly and accurately acquired.

In addition, the phases of the vector components V'dq that are obtained by decomposing the command voltage vector Vdq are allowed to have a value outside the predetermined phase range including the phases of the reference voltage vectors, and the product of the cosine values of the phases of the vector components V'dq and the magnitudes of the vector components V'dq are allowed to be the same as the magnitude of the command voltage vector Vdq, so that the phases and magnitudes of the two vector components V'dq are changed. Therefore, even in the case where a desired length of the pulse width for suitably detecting the DC side current of the inverter 13 is difficult to secure by allowing the phase of the one of the two vector components V'dq that are obtained by decomposing the command voltage vector Vdq to have a value within the predetermined phase range including the phases of the reference voltage vectors, two phase currents in a time interval of one period of the carrier signal can be suitably acquired by changing the phases and magnitudes of the two vector components.

In addition, by quantitatively analyzing the harmonic components that are generated by decomposing the command voltage vector Vdq into the two vector components V'dq by using the mathematical equations, the harmonic components can be easily controlled.

Figure 12:
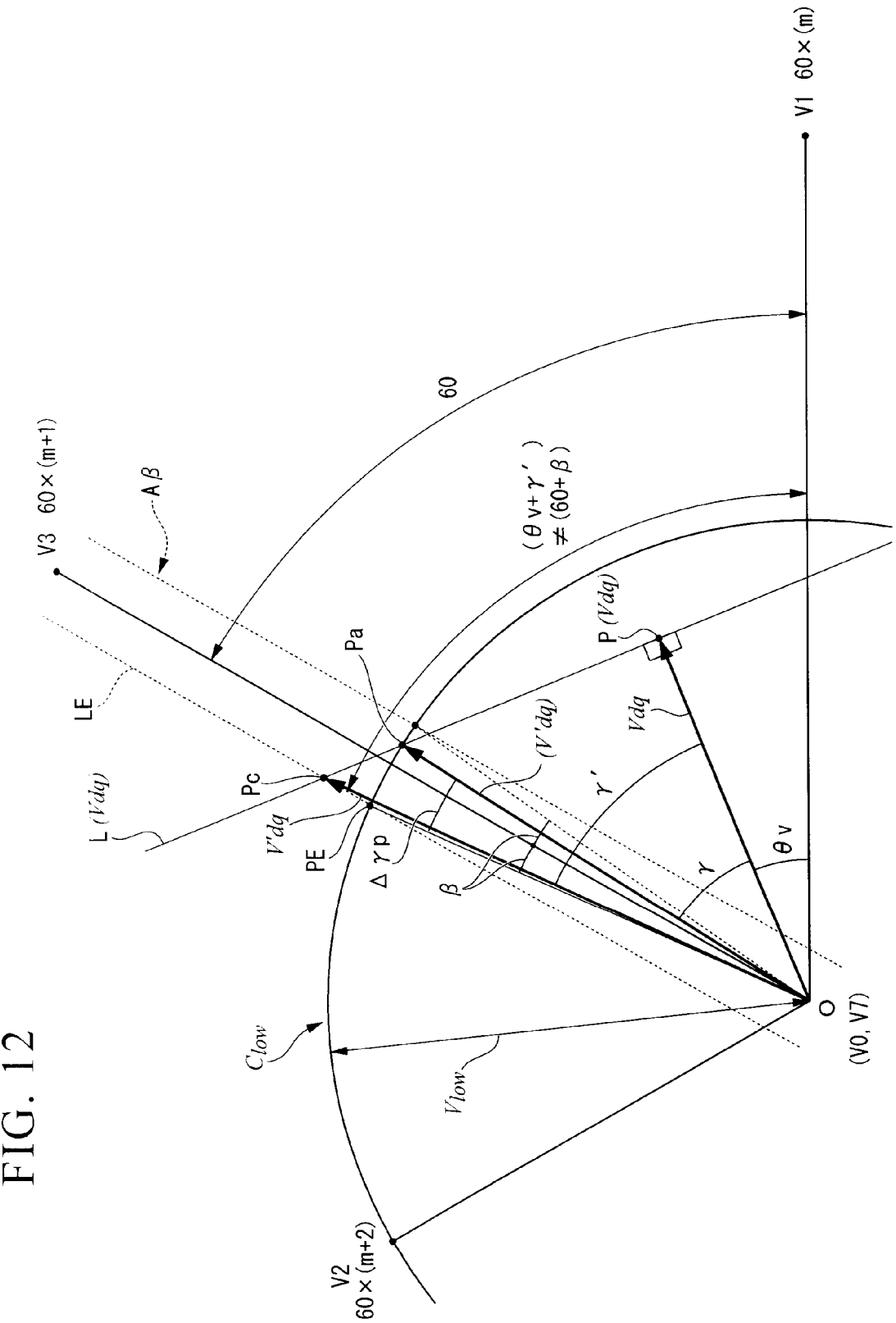
FIG. 12 is a view showing an example of a command voltage vector Vdq and a phase-angle-leading-side vector component V'dq according to an embodiment of the present invention.

In addition, in the aforementioned embodiment, in the case where the phases of the vector components V'dq have a value within the reference voltage vector region Aβ, for example, as shown in FIG. 8, the coordinate position of the new vector component V'dq is set to the intersection Pb between the straight line L(PE) including the origin O and the boundary point PE of the reference voltage vector region Aβ and the straight line L(Vdp) perpendicular to the command voltage vector Vdq including the coordinate position P(Vdq) according to the command voltage vector Vdq. However, the present invention is not limited thereto, but for example, similarly to the modified example of the aforementioned embodiment shown in FIG. 12, the coordinate position of the new vector component V'dq may be set to the intersection Pc between the straight line L(Vdp) and the straight line LE (that is, the boundary line of the reference voltage vector region Aβ) including the boundary point PE of the reference voltage vector region Aβ in parallel to the reference voltage vector.

In addition, in the aforementioned embodiment, in the case where the phase of the command voltage vector Vdq has a value within the predetermined phase range including the phases of the reference voltage vectors V1 to V6, the control unit 24 decomposes the command voltage vector Vdq into the two vector components Vdq1 and Vdq2. However, the present invention is not limited thereto, but the control unit 24 may always decompose the command voltage vector Vdq into the two vector components Vdq1 and Vdq2.

In addition, in the aforementioned embodiment, in the case where the magnitude of the command voltage vector Vdq is less than the predetermined lower limit voltage Vlow, the control unit 24 decomposes the command voltage vector Vdq into the two vector components V'dq. However, the present invention is not limited thereto, but the control unit 24 may always decompose the command voltage vector Vdq into the two vector components V'dq.

In addition, in the aforementioned embodiment, in the three-phase modulation using the carrier signal having a triangular waveform, the phase current estimation unit 23 calculates the average values for the phases from the detection values of the two phase currents in the time interval of one period Ts of the carrier signal and sets to the average values to the current values at the time point Ts/2 of the carrier peak of the valley. However, the present invention is not limited thereto, but for example, even in the two-phase modulation, the phase current estimation unit 23 may calculate the average values for the phases from the detection values of the two phase currents in the time interval of one period Ts of the carrier signal and set to the average values to the current values at the time point Tp of the carrier peak of the valley.

In other words, according to the aforementioned embodiment, by quantitatively analyzing the harmonic components that are generated by decomposing the command voltage vector Vdq into the two vector components, which have the same phase difference at the phase-angle-leading-side and the phase-angle-lagging-side from the command voltage vector Vdq, by using the mathematical equations, the two-phase currents in the time interval of one period of the carrier signal can be suitably acquired irrespective of the change in the modulation schemes, that is, two-phase modulation or three-phase modulation, or the change in the frequency of the carrier signal.

In addition, in the aforementioned embodiment, the angle sensor 32 may be omitted, and instead of the angle sensor, the magnetic pole position estimation apparatus of the motor may be configured to include a magnetic pole position estimation unit (not shown) that estimates the magnetic pole position of the motor 11 based on a change in an inductance when the harmonic voltages are applied.

According to the magnetic pole position estimation apparatus of the motor, by quantitatively analyzing the harmonic components that are generated by decomposing the command voltage vector Vdq into the two vector components by using the mathematical equations, the harmonic components can be easily controlled, so that a desired estimation accuracy in the estimation of the magnetic pole position can be secured.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A phase current estimation apparatus for a motor comprising:
   an inverter that sequentially commutes electrical conductions of a three-phase AC motor according to a pulse width modulated signal;
   a pulse width modulated signal generation unit that generates the pulse width modulated signal according to a carrier wave signal;
   a DC side current sensor that detects a DC side current of the inverter;
   a phase current estimation unit that estimates a phase current based on the DC side current detected by the DC side current sensor;
   a determination unit that determines whether or not a magnitude of a command voltage vector of the motor is less than a predetermined lower limit voltage;
   a vector decomposition unit that decomposes the command voltage vector into two vector components which have same magnitudes as the predetermined lower limit voltage for every two adjacent periods in units of a period of a carrier wave and same predetermined phase value at phase-angle-leading-side and phase-angle-lagging-side from the command voltage vector, in a case where the magnitude of the command voltage vector is less than the predetermined lower limit voltage as a determination result of the determination unit;
   a phase determination unit that determines whether or not a phase of each of the vector components has a value within a predetermined phase range including a phase of a reference voltage vector; and
   a vector component changing unit that changes the phase and the magnitude of the vector component so that the phase of the vector component is allowed to have a value outside the predetermined phase range and so that a product of a cosine value of a phase difference with respect to the command voltage vector of the vector component and the magnitude of the vector component is allowed to be same as the magnitude of the command voltage vector, in the case where the phase of the vector component has a value within the predetermined phase range as a determination result of the phase determination unit.

2. The phase current estimation apparatus for a motor according to claim 1, further comprising a harmonic component calculation unit that calculates a harmonic component corresponding to the vector component.

3. A magnetic pole position estimation apparatus for a motor comprising:
   the phase current estimation apparatus for a motor according to claim 2; and
   an estimation unit that estimates a magnetic pole position of the motor based on a change in an inductance when the harmonic components are applied to the motor.

* * * * *